United States Patent [19]

Rolson

[11] Patent Number: 6,003,633
[45] Date of Patent: Dec. 21, 1999

[54] PORTABLE TRUCK OR TRAILER LADDER ASSEMBLY

[75] Inventor: Robert G. Rolson, 6555 S. Highway B, Foxboro, Wis. 54836

[73] Assignee: Robert G. Rolson, Foxboro, Wis.

[21] Appl. No.: 08/778,166

[22] Filed: Jan. 2, 1997

Related U.S. Application Data

[63] Continuation of application No. 08/417,082, Apr. 5, 1995, abandoned.

[51] Int. Cl.$^6$ ....................................................... E06C 5/04
[52] U.S. Cl. ............................ 182/127; 182/106; 182/97; 280/166
[58] Field of Search ............................... 182/106, 97, 206, 182/95, 127; 280/166

[56] References Cited

U.S. PATENT DOCUMENTS

| | | | |
|---|---|---|---|
| 290,348 | 12/1883 | Olsen | 182/97 |
| 2,467,800 | 4/1949 | Backlin | 182/106 |
| 3,123,178 | 3/1964 | Monaghan et al. | 182/97 |
| 3,232,376 | 2/1966 | Lucas | 182/97 |
| 3,291,255 | 12/1966 | Glatfelter | 182/97 |
| 3,406,784 | 10/1968 | Jones | 182/97 |
| 3,563,342 | 2/1971 | Lasiter | 182/97 |
| 3,677,562 | 7/1972 | Bronstein | 280/179 A |
| 3,973,646 | 8/1976 | Martinez | 182/106 |
| 4,161,997 | 7/1979 | Norman | 182/93 |
| 4,236,601 | 12/1980 | Naka | 182/76 |
| 4,245,716 | 1/1981 | Rayfield | 182/86 |
| 4,333,547 | 6/1982 | Johansson | 182/90 |
| 4,408,680 | 10/1983 | Ross | 182/68 |
| 4,492,286 | 1/1985 | Lemire | 182/93 |
| 4,724,925 | 2/1988 | Ritten | 182/97 |
| 4,757,876 | 7/1988 | Peacock | 182/95 |
| 4,815,787 | 3/1989 | Hale | 296/167 |
| 4,828,074 | 5/1989 | Combs | 182/152 |
| 4,867,497 | 9/1989 | Jayne | 296/3 |
| 5,024,292 | 6/1991 | Gilbreath et al. | 182/90 |
| 5,064,022 | 11/1991 | Graham | 182/85 |
| 5,163,531 | 11/1992 | Whiting | 182/89 |
| 5,190,337 | 3/1993 | McDaniel | 296/3 |
| 5,469,933 | 11/1995 | Thomason | 182/127 |

OTHER PUBLICATIONS

Brochure from Unique–Truck Equipment, Inc., "Summer Savings! On Safety and Maintenance Products for Today's Fleets", p. 6 (1996).

Brochure from Unique–Truck Equipment Catalog, "Safety and Maintenance for Today's Fleets", p. 17 (Spring 1996).

*Primary Examiner*—Alvin Chin-Shue
*Attorney, Agent, or Firm*—Mueting, Raasch & Gebhardt, P.A.

[57] ABSTRACT

A portable ladder for attachment to truck and trailer beds having stake or post pockets spaced about the outer periphery of the truck or trailer frame, including an attachment plate having a post sized for fitting into one of the stake or post pockets and a ladder section pivotally connected to the attachment plate by a pair of links or hinges, to permit the ladder section to be pivotally moved downwardly over the edge of the truck or trailer bed into a use position for climbing and to be pivotally moved upwardly over the truck or trailer bed into a stowage position.

7 Claims, 4 Drawing Sheets

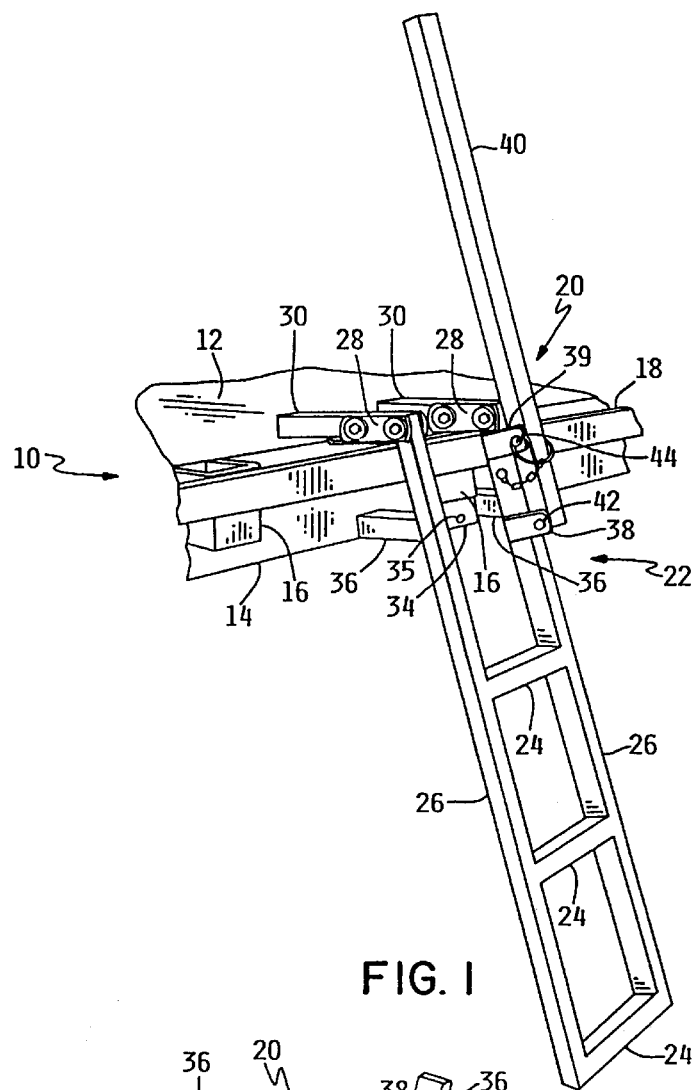
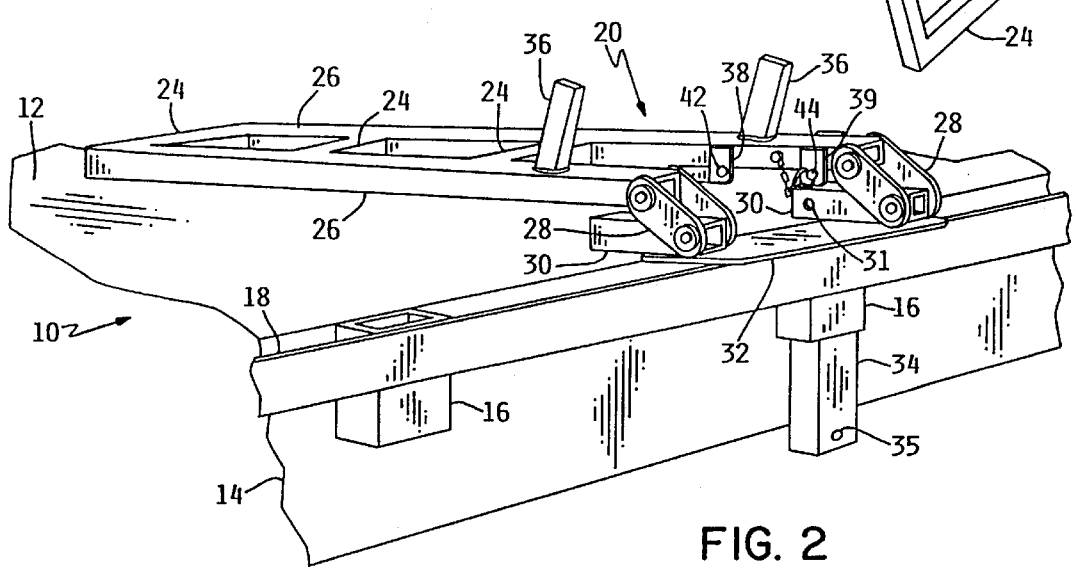
FIG. 1
FIG. 2

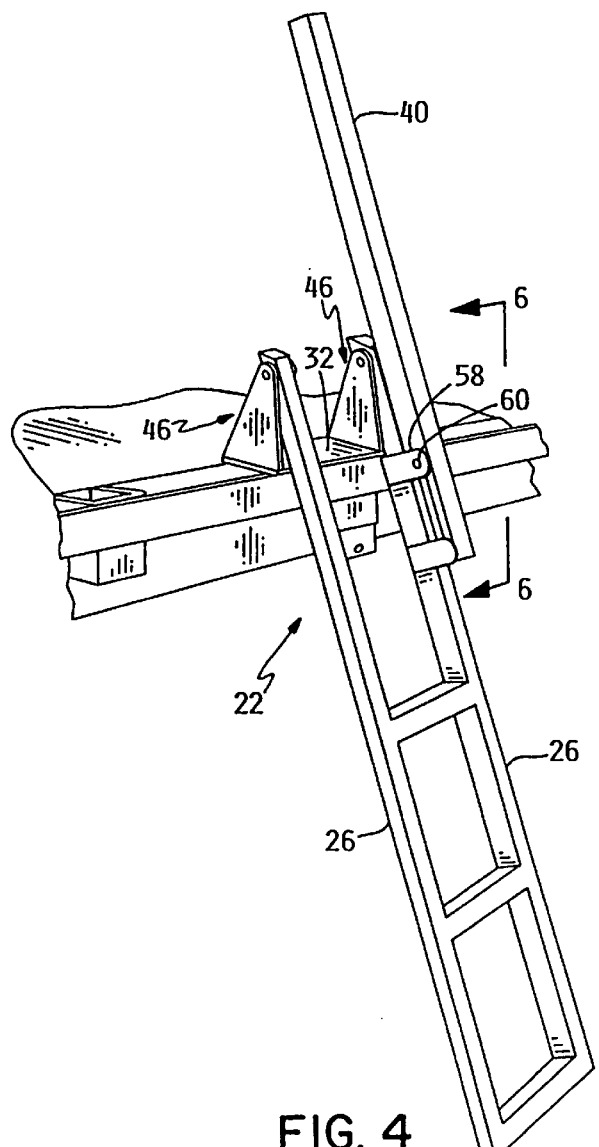
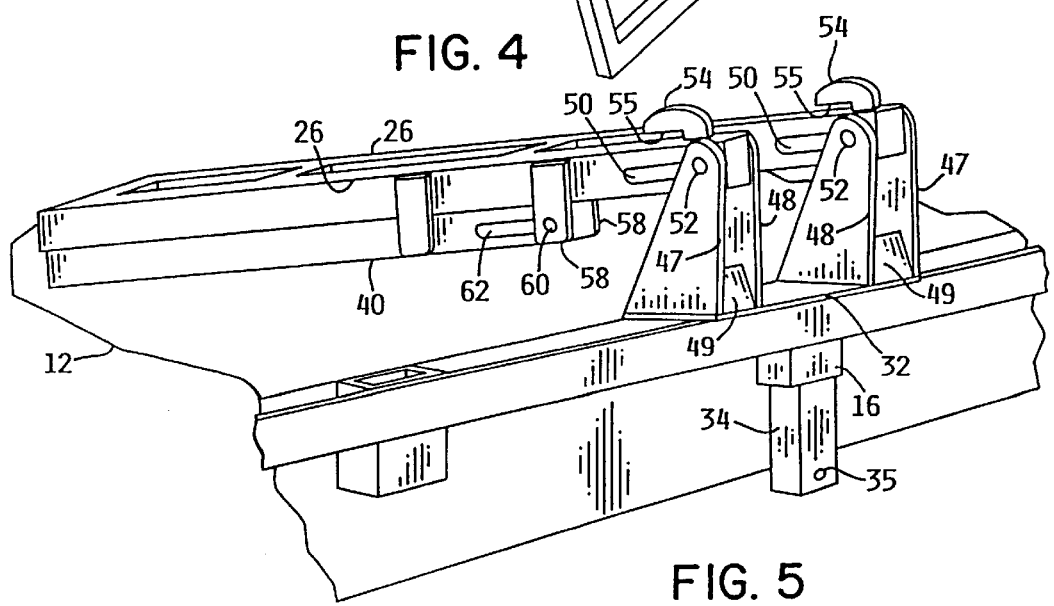
FIG. 4
FIG. 5

6,003,633

PORTABLE TRUCK OR TRAILER LADDER ASSEMBLY

This application is a continuation of Ser. No. 08/417,082, filed Apr. 5, 1995, abnd.

BACKGROUND OF THE INVENTION

This invention relates to truck ladders which facilitate the user's access to a truck bed; in particular, the invention relates to a detachable ladder for accessing the bed of a flatbed truck or trailer from the ground. In most cases, the bed of a flatbed truck trailer is about five feet above the ground surface, making it difficult to climb on and off the bed. It is frequently necessary to access the bed of a truck trailer while loading and unloading the trailer, and some trucks have permanently mounted step rails positioned for this purpose. However, a permanently mounted step rail must be mounted so as not to increase the overall width of the trailer in order to comply with highway regulations, and therefore such step rails are usually positioned vertically beneath the outer edge of the truck frame, which makes it difficult to use them for climbing onto the bed.

For safe operation and convenient ease of access, it is desirable that an access ladder be positioned at a reasonable angle relative to vertical, and it is also desirable that the ladder have some form of handrail to assist the user while climbing on the ladder. Furthermore, it is desirable that the ladder be portable so that it can be used at many points around the trailer bed, for frequently the trailer has a partial load which prevents access to the trailer bed where the partial load is located. It is also desirable that the ladder be capable of convenient stowage when not in use, but in a position which maintains a fixed attachment to the trailer so that the ladder cannot be lost while the truck is being moved. When the ladder is stowed it must be secured to prevent it from falling off the trailer, which could cause a dangerous highway hazard.

SUMMARY OF THE INVENTION

The invention comprises a ladder pivotally mounted to an attachment bracket which rests on the bed of a truck trailer. The attachment bracket is fixedly attached to a rectangular metal post which is sized to fit into one of the stake pockets which are intended for receiving stakes or the like which extend the carrying capacity of the trailer. The ladder has a pivotal handrail which may be latched into an extended position to assist the user when the ladder is in use and may be folded against the ladder to a relatively flat form for stowage. The pivotal connection between the ladder and the attachment bracket is made by two links so that the ladder can be positioned well outside the trailer frame while in use but can be pivoted upwardly and inwardly to permit the ladder to be stowed on the trailer bed without projecting outwardly beyond the trailer frame.

It is a principal object of the present invention to provide an access ladder for a truck bed which can be fixedly attached to the truck or truck trailer, while being conveniently positionable to a use position and to a stowage position.

It is another object of the present invention to provide a ladder which is portable and may be attached to a truck trailer at a plurality of attachment positions.

It is another object of the present invention to provide a ladder for access to a truck trailer bed, and which has a safety handrail for facilitating use.

It is a further object of the invention to provide a ladder which is positioned at a convenient angle relative to vertical for easy climbing and which is positioned against the trailer bed in flat form for stowage.

The foregoing, and other objects and advantages, will become apparent from the following specification and claims, and with reference to the appended drawings.

BRIEF DESCRIPTION OF THE DRAWINGS

FIG. 1 shows one embodiment of the invention in isometric view in a use position;

FIG. 2 shows the same embodiment of the invention in isometric view in a stowage position;

FIG. 4 shows an isometric view of a second embodiment of the invention in a use position;

FIG. 5 shows an isometric view of the second embodiment in a stowage position.

DESCRIPTION OF THE PREFERRED EMBODIMENT

Figure 3:
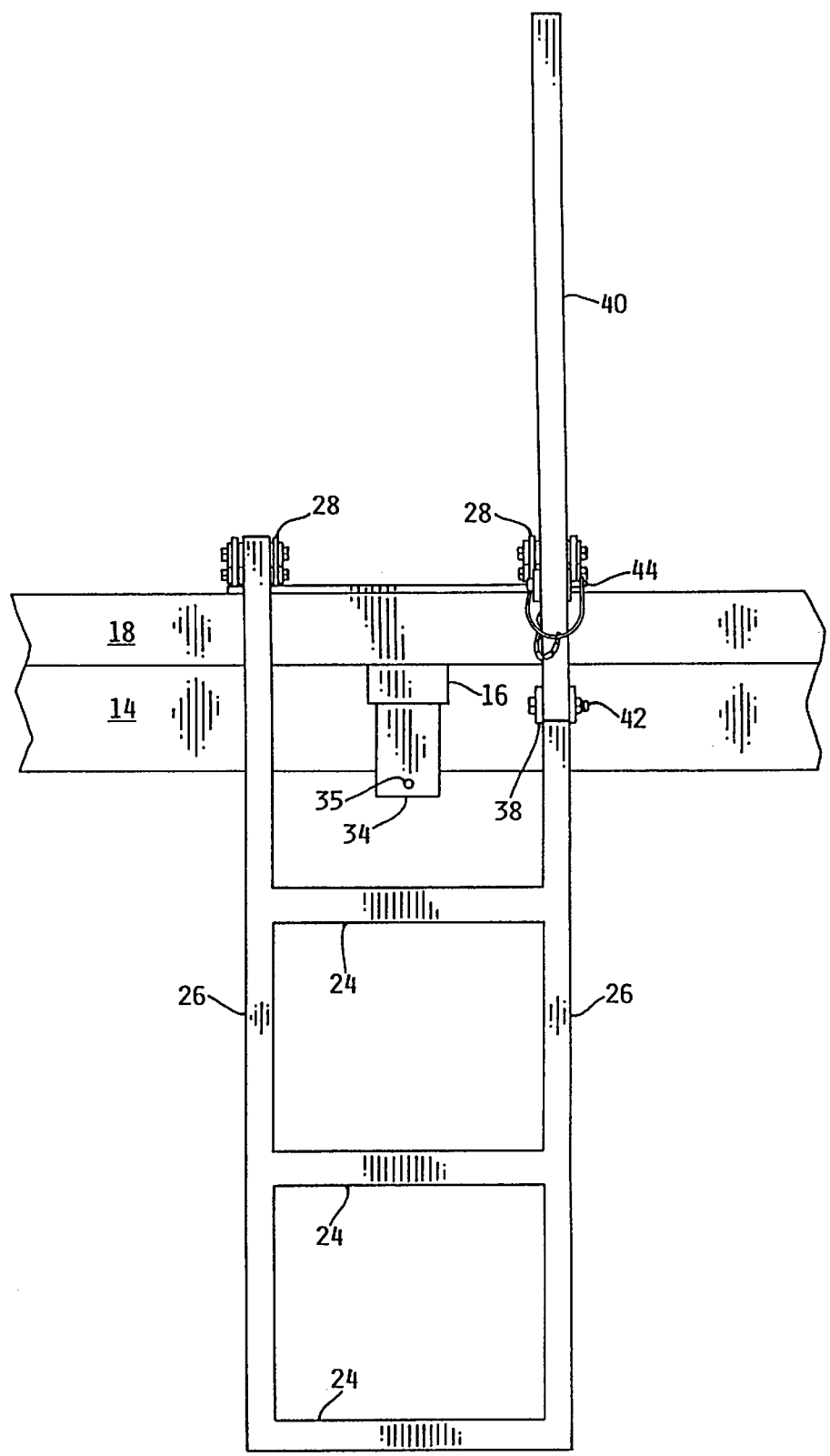
FIG. 3 shows a front elevation view of the same embodiment of the invention in a use position.

It is a characteristic of most flatbed trucks or truck trailers to have a plurality of regularly spaced stake pockets about the outer periphery of the bed. These pockets are used to receive and hold stakes or posts which then extend upwardly above the bed of the truck or trailer and can be used to support a load which can be stacked on the bed. The pockets typically are rectangular metal tubes, open at their top and bottom ends, which are welded to the side frame of the truck or trailer with the tubes in a vertical position. The present invention is intended to be operable with any truck or trailer having this construction.

Referring first to FIG. 1, the invention is shown in isometric view in a use position, attached to a truck trailer 10. Trailer 10 has a flatbed 12 and a side frame 14 with a plurality of stake pockets 16 affixed to the side frame 14 at regular intervals. A protective rail 18 is affixed to the outer sides of the pockets 16. Each of the pockets 16 is in the form of a rectangular tube having open top and bottom ends, and the primary function of the pockets 16 is to provide receptacles for holding stakes or posts which project upwardly above the surface of bed 12 and extend the carrying capacity of the trailer 10. The portable ladder 20 may be affixed to the trailer 10 by insertion into one of the pockets 16 in the manner shown in FIGS. 1 through 3. Ladder 20 has a frame section 22 with a plurality of ladder step bars 24 affixed between parallel bars 26. The upper end of each of the parallel bars 26 is pivotally pinned to a link 28, and link 28 is also pivotally pinned to a bracket 30. Each of the two brackets 30 are welded to a support plate 32 which rests on the bed 12 and the top edge of the rail 18. A rectangular post 34 is welded to the bottom surface of support plate 32 and is sized to slidably fit into any of the stake pockets 16; post 34 is inserted through any one of the stake pockets 16. An opening 35 near the bottom of post 34 may be used for connecting to a locking device in order to prevent post 34 from being removed from pocket 16. A standoff bracket 36 is welded to each of the parallel bars 26 and is sized to support the ladder frame section 22 at an inclined angle as shown in FIG. 1 when the ladder 20 is in a use position. The standoff brackets 36 contact the truck side frame 14 to limit the amount of downward pivotal motion of ladder frame section 22; the preferred angle of inclination of ladder section 22 relative to horizontal is about 60 degrees.

A handrail 40 is pivotally attached to one of the parallel bars 26 by a pin 42, which passes through a tab 38 welded to bar 26, and openings through one end of handrail 40. A second tab 39 is also welded to bar 26, and a removable locking pin 44 may be engaged through tab 39 and corresponding openings through handrail 40, to lock handrail 40 in the extended position shown in FIG. 1. Prior to placing the portable ladder 20 in a stowage position, the locking pin 44 is removed from its engagement through tab 39 and handrail 40, and handrail 40 is pivoted about pin 42 until it is positioned adjacent bar 26.

FIG. 2 shows an isometric view of the portable ladder 20 in a stowage position, resting on top of truck bed 12. In this position, the frame section 22 is pivoted upwardly about the pinned connections to brackets 30 until the frame section 22 comes to rest on the bed 12. The links 28 are also pivoted upwardly and inwardly so as not to project outside the rail 18. The ladder 20 may be locked into a stowage position by inserting locking pin 44 through the opening 31 in bracket 30.

FIG. 3 shows a front elevation view of the portable ladder 20 in a use position, with the handrail 40 extended as described above. Of course, the handrail 40 may be attached to either of the parallel bars 26, and two handrails may be used in a similar manner in particular situations. It is preferred that the lowest step bar 24 not contact the ground surface when the ladder 20 is in a use position, it being desirable that the position of the lowest step bar 24 be a convenient stepping distance above the ground surface.

FIG. 4 shows a second embodiment of the invention in a use position. In this embodiment, the ladder frame section 22 is pivotally mounted to a pair of hinge brackets 46. Each hinge bracket 46 comprises a pair of plates 47, 48 which are welded to support plate 32 at relatively spaced-apart positions, as can best be seen with reference to FIG. 5. An inclined plate 49 is affixed between each of the plates 47, 48 and is also affixed to support plate 32. Each of the ladder bars 26 has an elongated slot 50 passing therethrough and a pin 52 pivotally mounts the frame section 22 to the respective plates 47, 48 by passing through the slots 50 in the respective parallel bars 26. A latch 54 is welded to each of the parallel bars 26 proximate the pivot head and each latch 54 has a flat surface 55 which is spaced away from bar 26.

Handrail 40 is pivotally mounted between a pair of tabs 58 by a pin 60, which engages through a slot 62 in handrail 40. Handrail 40 is shown in FIG. 4 mounted to a right-side parallel bar 26 and is shown in FIG. 5 as being mounted to a left-side parallel bar 26. It is to be understood that either mounting arrangement is permissible, and the invention also contemplates the use of a pair of handrails 40, one mounted to each side of the frame section 22.

Figure 6:
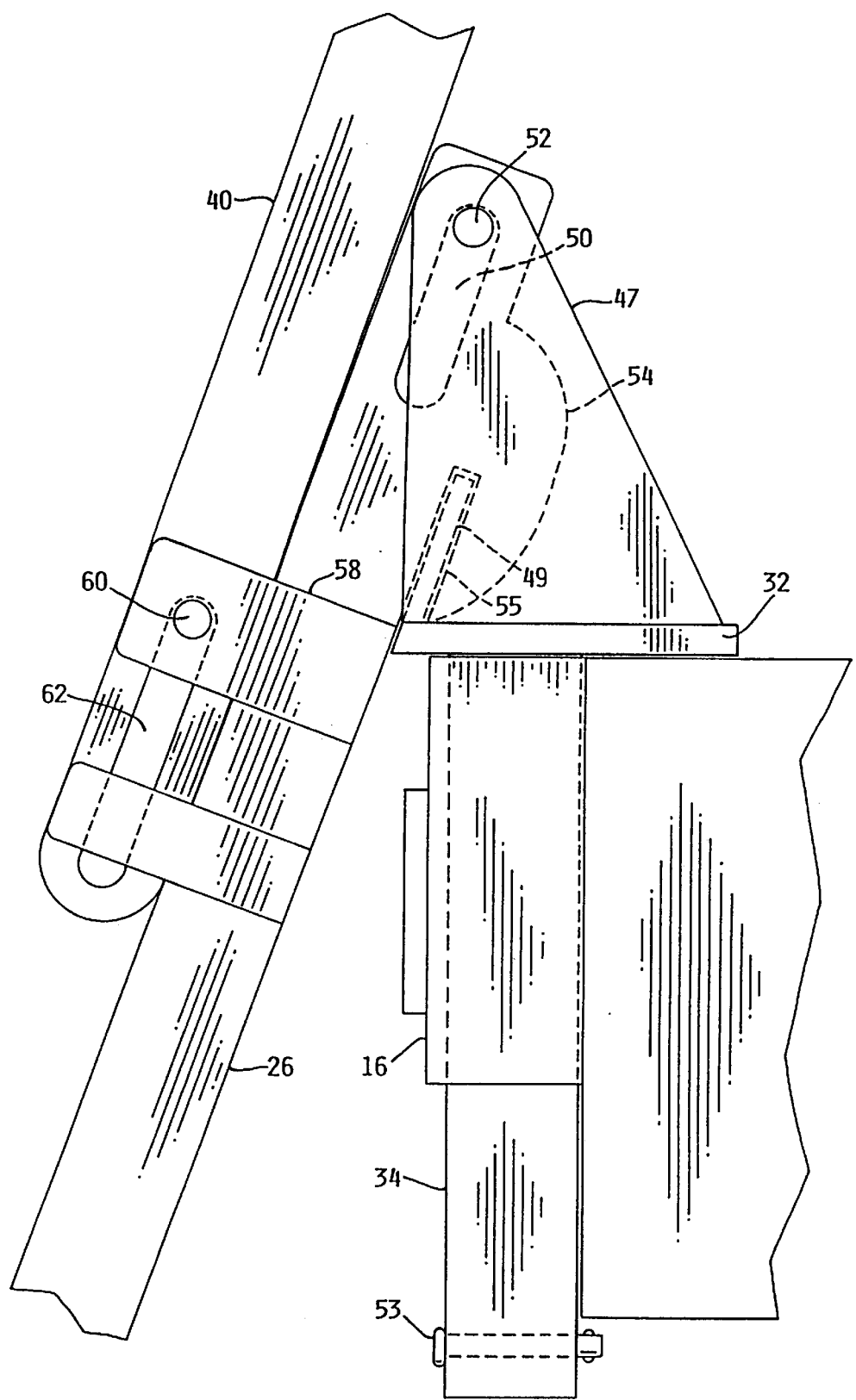
FIG. 6 shows a view taken along the lines 6—6 of FIG. 4.

Reference should be made to FIG. 6 for an understanding of the engagement of the second embodiment of the invention into a use position. FIG. 6 is a view taken along the lines 6—6 of FIG. 4 showing the engagement of latch 54 against inclined plate 49 in the use position. In this position, pin 52 engages through the topmost end of slot 50 in each of the parallel bars 26. Likewise, handrail 40 is shown in the use position in FIG. 6 wherein pin 60 is engaged near the topmost edge of slot 62, and handrail 40 is held against one of the parallel bars 26 as shown. It is to be understood that latch 54 may take other forms different from the precise form shown in FIG. 6. For example, latch 54 may take the form of a welded angle bracket which has a lower end spaced away from the surface of parallel bars 66 so as to form the surface 55 which engages the inclined plate 49. Of course, the functions of the two inter-engaging components 54 and 49 could be reversed; i.e., the plate 49 could be welded to the ladder section and could be slidable downwardly to engage a latch 54 which is affixed to support plate 32. The important function is to provide a feature which permits a slidable and locking engagement of the ladder section against the fixed support plate 32 so as to fixedly hold the ladder section in a position approximately as shown in FIG. 6.

In order to move the second embodiment of the invention from a use position to a stowage position, handrail 40 is first slidably moved upwardly along the parallel bar 26 until pin 60 engages the bottom most edge of slot 62. Handrail 40 is then pivotally rotated about pin 60 until it is positioned against parallel bar 26 in the manner shown in FIG. 5. Likewise, parallel bars 26 are slidably moved upwardly to release latch 54 from engagement against inclined plate 49 until pin 52 is positioned at the bottom most point of slot 50. At that position, the parallel bars 26 are pivotally moved about pin 52 until they are rotated to the position shown in FIG. 5, resting on the trailer bed 12.

In order to move the portable ladder from the stowage position shown in FIG. 5 to the use position shown in FIG. 6, it is merely necessary to pivot the parallel bars 26 upwardly away from the trailer bed 12 and about pins 52 until they are rotated to the position shown in FIG. 6. At the same time, the parallel bars are lowered to cause pin 52 to engage against the topmost edge of slot 50 and also to cause latch 54 to engage about the inclined plate 49. The handrail 40 may then be pivotally moved about pin 60 and slidably positioned as shown in FIG. 6.

In operation, the portable ladder 20 is initially attached to a trailer 10, or to the bed of a truck, by inserting the rectangular post 34 into one of the truck/trailer stake pockets 16. The portable ladder 20 may be stowed by pivoting it into the position shown in FIGS. 2 or 5, where it can be carried by the truck/trailer until it is ready for use. To place the ladder in the use position shown in FIGS. 1, 3, 4 or 6, it is only necessary to perform the pivotal motions described above. A locking pin 53 may be used to secure the post 34 against removal from pocket 16.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A portable ladder apparatus for attachment to a truck or trailer having at least one stake pocket, the apparatus comprising:

a support plate;

a ladder section having a plurality of steps affixed between a pair of ladder bars, the ladder section having a top and bottom, wherein respective ladder bars are is pivotally attached to opposite ends of the support plate for rotation of the ladder section between a use position in which the ladder section is inclined at an angle relative to vertical with the bottom of the ladder section being located below the support plate, and a stowage position in which the bottom of the ladder section is located above the support plate; and a connector for connecting the support plate to one of the at least one stake pocket, the connector consisting essentially of a generally rectangular post fixedly attached to the support plate, the post being sized for insertion into the stake pocket wherein the support plate is constrained from rotating about a vertical axis extending through the stake pocket.

2. An apparatus according to claim 1, further comprising means for locking the post within the stake pocket.

3. The apparatus of claim 1, further comprising a handrail attached to one of the ladder bars.

4. The apparatus of claim 3, wherein the handrail is pivotally connected to the ladder bar.

5. The apparatus of claim 4, further comprising means for locking the handrail in an extended position.

6. The apparatus of claim 1, further comprising a standoff bracket supporting the ladder section inclined at an angle relative to vertical.

7. The apparatus of claim 6, wherein the standoff bracket is attached to at least one of the ladder bars.

* * * * *